US010824788B2

(12) United States Patent
Staar et al.

(10) Patent No.: US 10,824,788 B2
(45) Date of Patent: Nov. 3, 2020

(54) COLLECTING TRAINING DATA FROM TEX FILES

(71) Applicant: International Business Machines Corporation, Armonk, NY (US)

(72) Inventors: Peter Willem Jan Staar, Wadenswil (CH); Michele Dolfi, Zurich (CH); Christoph Auer, Zurich (CH); Aleksandros Sobczyk, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/270,798

(22) Filed: Feb. 8, 2019

(65) Prior Publication Data

US 2020/0257755 A1 Aug. 13, 2020

(51) Int. Cl.
*G06F 17/21* (2006.01)
*G06F 40/103* (2020.01)
*G06N 20/00* (2019.01)
*G06F 40/20* (2020.01)
*G06F 40/123* (2020.01)

(52) U.S. Cl.
CPC .......... *G06F 40/103* (2020.01); *G06F 40/123* (2020.01); *G06F 40/20* (2020.01); *G06N 20/00* (2019.01)

(58) Field of Classification Search
CPC ....... G06F 3/0638; G06F 3/0667; G06F 17/40
USPC ....................................................... 715/204
See application file for complete search history.

(56) References Cited

U.S. PATENT DOCUMENTS 5,774,579 A * 6/1998 Wang ................. G06K 9/00442
382/176
8,249,344 B2 8/2012 Viola et al.
(Continued)

OTHER PUBLICATIONS

Siegel, N., et al., "Extracting Scientific Figures with Distantly Supervised Neural Networks", arXiv:1804.02445v2, May 30, 2018, JCDL' 18, Jun. 3-7, 2018, pp. 1-10.
(Continued)

*Primary Examiner* — Scott T Baderman
*Assistant Examiner* — Hassan Mrabi
(74) *Attorney, Agent, or Firm* — Scully, Scott, Murphy & Presser, P.C.; Daniel P. Morris

(57) ABSTRACT

A method of collecting training data of a document component may be provided. The documents have a structure and are coded in the typesetting language TeX. The method comprise receiving a TeX source file, compiling it into a PDF file and a related sync file, analyzing the PDF file, thereby determining a non-text-only document component. The method comprises also determining first coordinates of the non-text-only document component and a corresponding page number, determining a typesetting command relating to a non-text-only document component and determining second coordinates of a bounding box and a corresponding page number from the sync file, determining text elements in the non-text-only document component of the PDF file for which the first coordinates and the second coordinates overlap, and combining the determined text elements and linking them to a type of a non-text document component determined in the non-text-only document component in the TeX source file.

15 Claims, 6 Drawing Sheets

(56) References Cited

U.S. PATENT DOCUMENTS

| | | | | |
|---|---|---|---|---|
| 2005/0010863 A1* | 1/2005 | Zernik | .................. | G06F 40/194 |
| | | | | 715/229 |
| 2006/0294460 A1* | 12/2006 | Chao | ..................... | G06F 40/103 |
| | | | | 715/209 |
| 2007/0003147 A1* | 1/2007 | Viola | .................... | G06F 40/211 |
| | | | | 382/229 |
| 2012/0102388 A1* | 4/2012 | Fan | ....................... | G06F 40/151 |
| | | | | 715/234 |
| 2017/0351913 A1* | 12/2017 | Chen | .................. | G06K 9/00442 |
| 2018/0322339 A1* | 11/2018 | Cohen | ................ | G06K 9/00456 |

OTHER PUBLICATIONS

Tkaczyk, D., "New Methods for Metadata Extraction from Scientific Literature", Ph.D. Thesis, ICM, University of Warsaw, Nov. 2015, arXiv:1710.10201v1, Oct. 27, 2017, 175 pages.

Praczyk, P.A., et al., "Automatic Extraction of Figures from Scientific Publications in High-Energy Physics", Information Technology and Libraries, Dec. 2013, pp. 25-52.

* cited by examiner

402

```
...
\begin{table*}
\begin{center}
\caption{Simulator pParameters}
\begin{tabular}
{ccccccccc} \hline \hline ID
&
$N_ {\rm r }\times {N}_ {\theta}$
&
$\Delta r/r$
&
$mach$
&
$t_ {\rm end}\$(Myr)
\\\hline\
HR
&
400§\\times$128
&
0.026
&
0.5 1.0, 2.0
&
201.0, 74.9, 74.9
........
.....
\\\hline\
\end{tabular}
\end{center}
....
```

404

```
...
\citep{BondiH:44}
\begin{center}
\parbox{columnwidth.....
.....
.....
\epsscale{center}
....
```

406

```
....
\begin{tabular} (c)
\epsscale{myscale } \plot1{f2.pdf }
\ end{tabular}
....
```

FIG. 4

COLLECTING TRAINING DATA FROM TEX FILES

FIELD OF THE INVENTION

The present disclosure relates generally to creating training data for machine learning, and more specifically, to a computer-implemented method for collecting training data of document components. The present disclosure relates further to a related collection system for collecting training data of document components, a computing system, and a computer program product.

BACKGROUND

For a training of machine-learning systems—also known as systems for artificial intelligence—training data are used. For supervised learning annotated or labeled data are used. Often, existing text documents can be used for the machine learning process. Also often, these text documents come as PDF files (portable document format) including—beside the pure text—also more complex document components like tables, headlines, citations, mathematical expressions, and so on. Typically, these more complex document components are not annotated or labored in a way which can be directly used for supervised learning of machine learning systems.

Therefore, in the field of document pre-processing for a training of machine learning systems, there may be two main tasks: on the one hand, one tries to extract the text of the document in reading order. On the other hand, one tries to extract document components with an internal structure (e.g., tables, figures, formulas, citations, . . . ). The latter task again splits up in two parts: (i) locating the component on a page and (ii) then understanding the structure of the component. In order to do so, one may have two approaches, either one uses a rule-based approach or one uses a data-driven machine-learning approach. Both approaches have advantages and disadvantages. Rule-based approaches are typically easy to develop, but not very accurate and due to the large variability across available documents. On the other side, machine-learning approaches tend to be more robust, but that requires an enormous amount of training data—in some cases also denoted as ground-truth—that is often very costly to come by, since it needs to be done manually.

However, large amounts of scientific papers are written in the TeX typesetting format and published as PDF documents. But it continues to be difficult—without manual labeling—to automatically interpret non-text document components and identify their related type in the published PDF documents.

SUMMARY

According to one aspect of the present invention, a computer-implemented method for collecting training data of document components may be provided. The document components may have a structure. The documents may be coded in the typesetting language TeX. The method may comprise receiving a TeX source file, compiling the TeX source file into a portable document format (PDF) file and a related sync file, and analyzing the PDF file, thereby determining a presence of a—in particular at least one—non-text-only document component.

The method may also comprise determining first coordinates of the non-text-only document component and a corresponding page number in the PDF file, determining a typesetting command relating to a non-text-only document component in the TeX source file as well as second coordinates of a corresponding bounding box of the non-text-only document component and the corresponding page number in the PDF file from the sync file, determining text elements in the non-text-only document component of the PDF file for which the first coordinates and the second coordinates overlap, and combining the determined text elements and linking them to a type of a non-text document component determined in the non-text-only document component in the TeX source file.

According to another aspect of the present invention, a related collection system for collecting training data of document components may be provided. The document components may have a structure. The documents may be coded in the typesetting language TeX. The system may comprise a receiving unit adapted for receiving a TeX source file, a compiler module adapted for compiling the TeX source file into a portable document format (PDF) file and a related sync file, and an analyzer module adapted for analyzing the PDF file, thereby determining a presence of a—in particular at least one—non-text-only document component.

The system may additionally comprise a determination unit adapted for determining first coordinates of the non-text-only document component and a corresponding page number in the PDF file, wherein the determination unit is also adapted for determining a typesetting command relating to a non-text-only document component in the TeX source file, as well as second coordinates of a corresponding bounding box of the non-text-only document component and the corresponding page number in the PDF file from the sync file, and wherein a determination unit may also be adapted for determining text elements in the non-text-only document component of the PDF file for which the first coordinates and the second coordinates overlap. Last but not least, the system may comprise a combination module adapted for combining the determined text elements and linking them to a type of a non-text document components determined in the non-text-only document component in the TeX source file.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
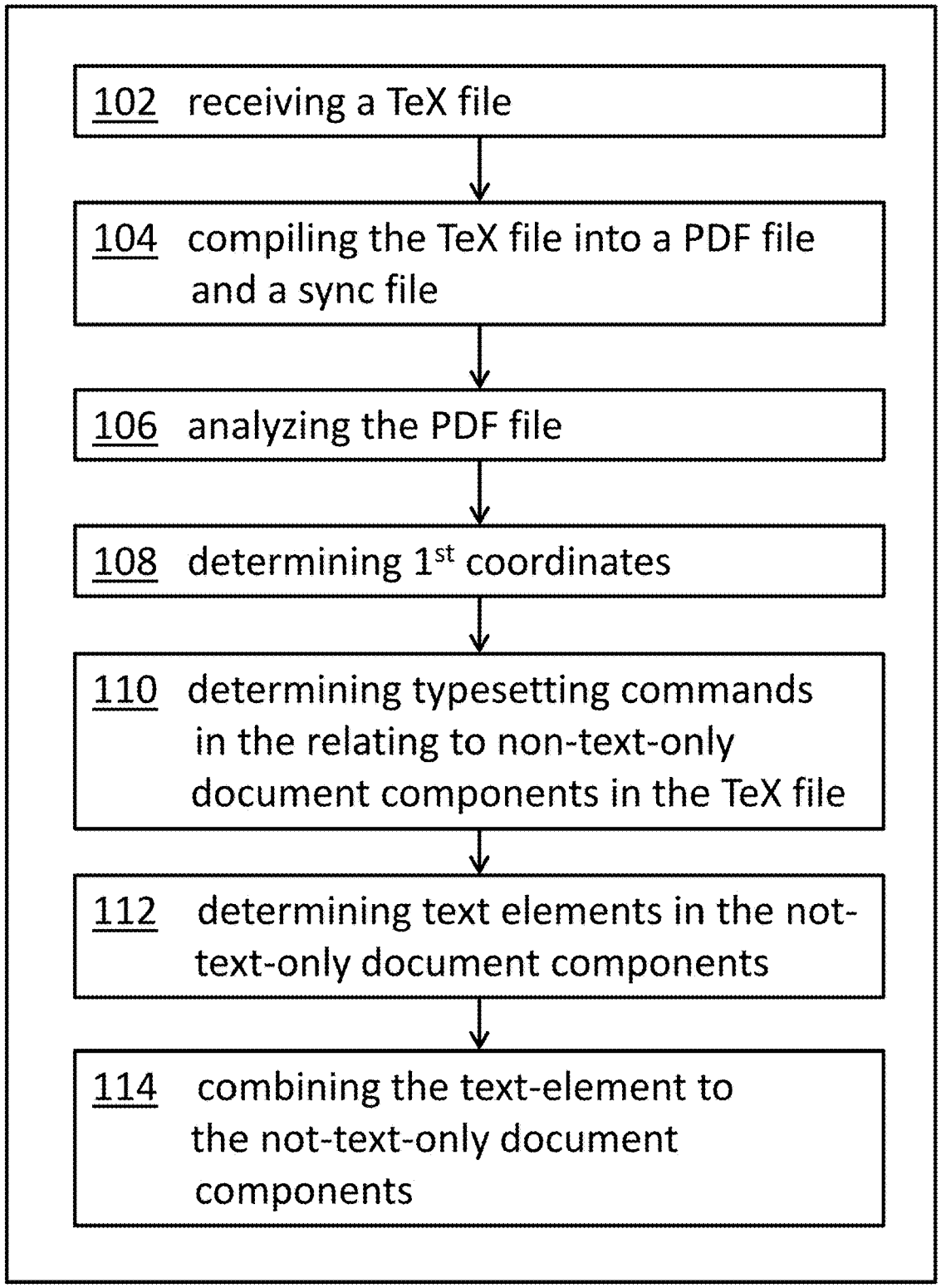

Preferred embodiments of the invention will be described, by way of example only, and with reference to the following drawings:

FIG. 1 shows a block diagram of an embodiment of the inventive computer-implemented method for collecting training data of document component.

Figure 2:
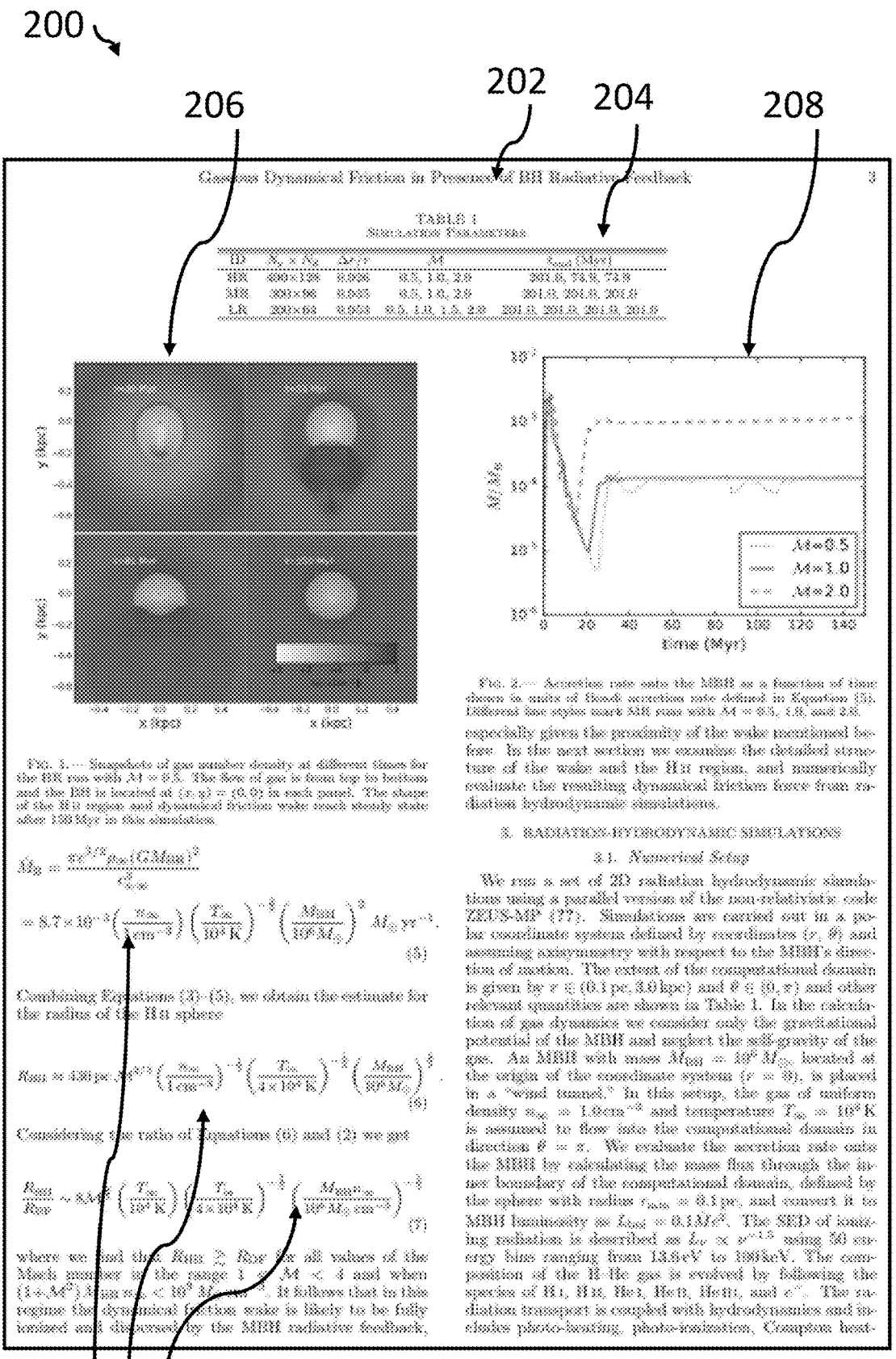

FIG. 2 shows an exemplary PDF document page.

Figure 3:
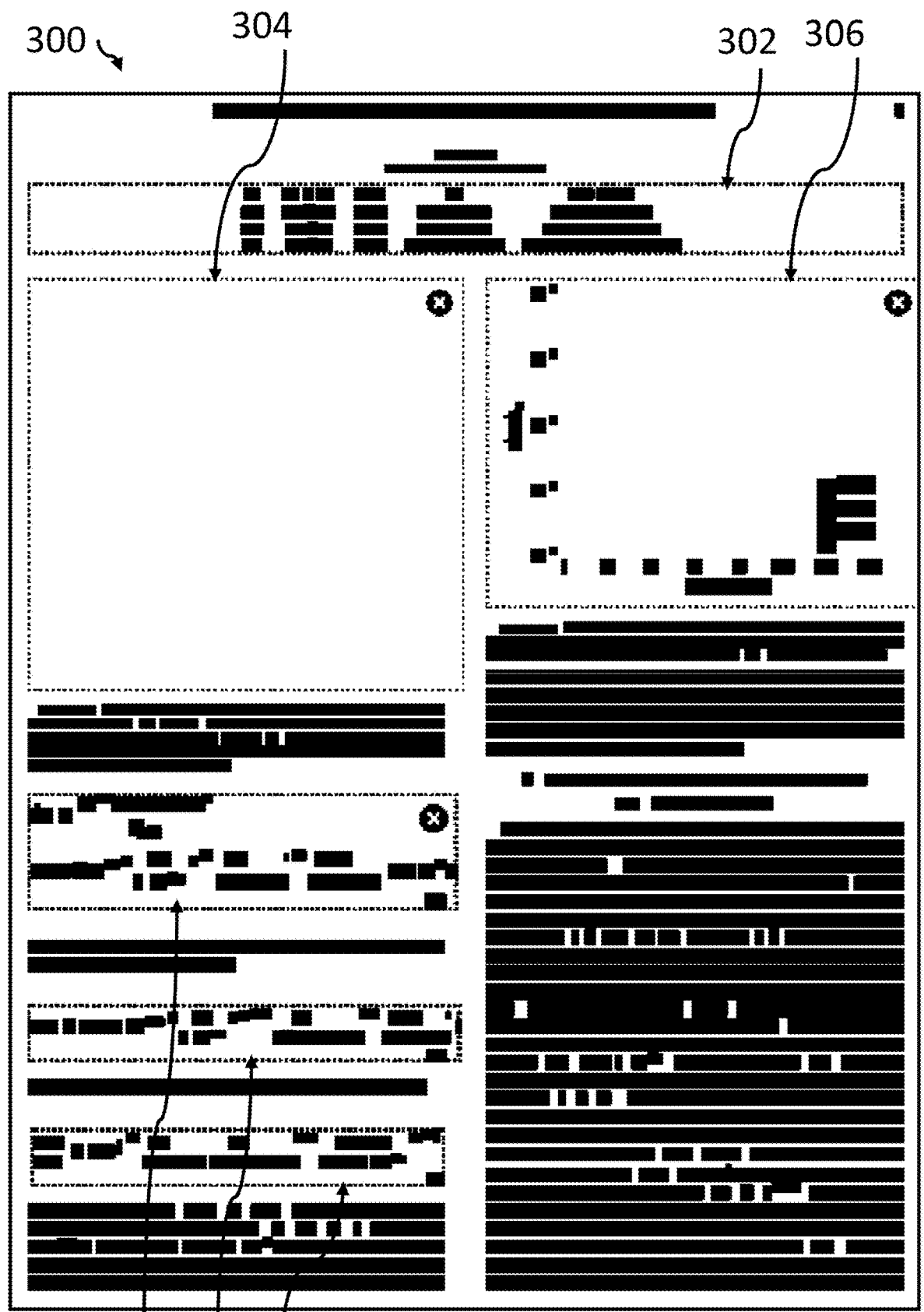

FIG. 3 shows a block diagram of an embodiment of the document page seen "through the eyes" of an analyzer.

FIG. 4 shows examples of TeX code segments referring to the PDF page example of FIG. 2.

Figure 5:
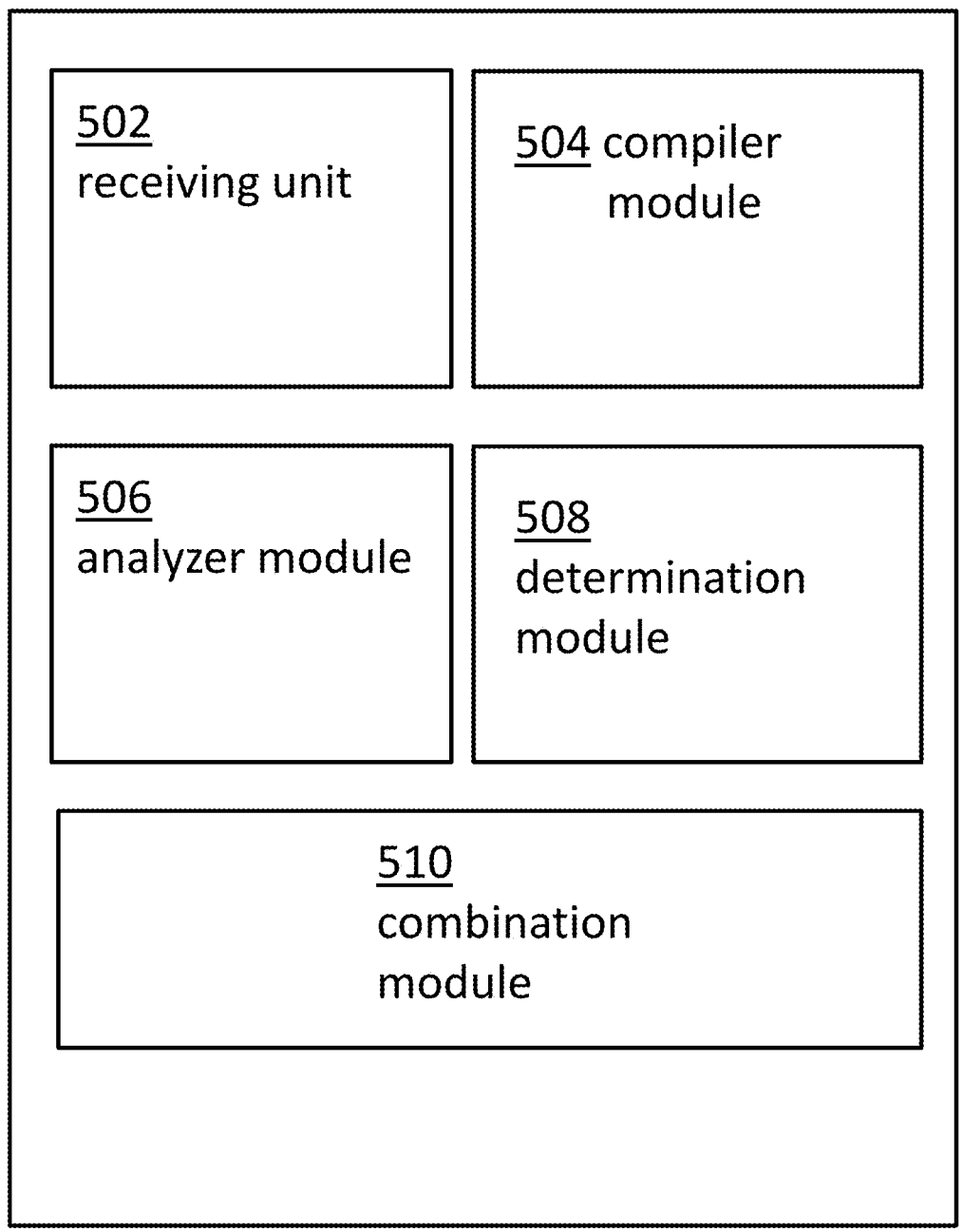

FIG. 5 shows an embodiment of a computing system comprising the system for collecting training data of document component.

Figure 6:
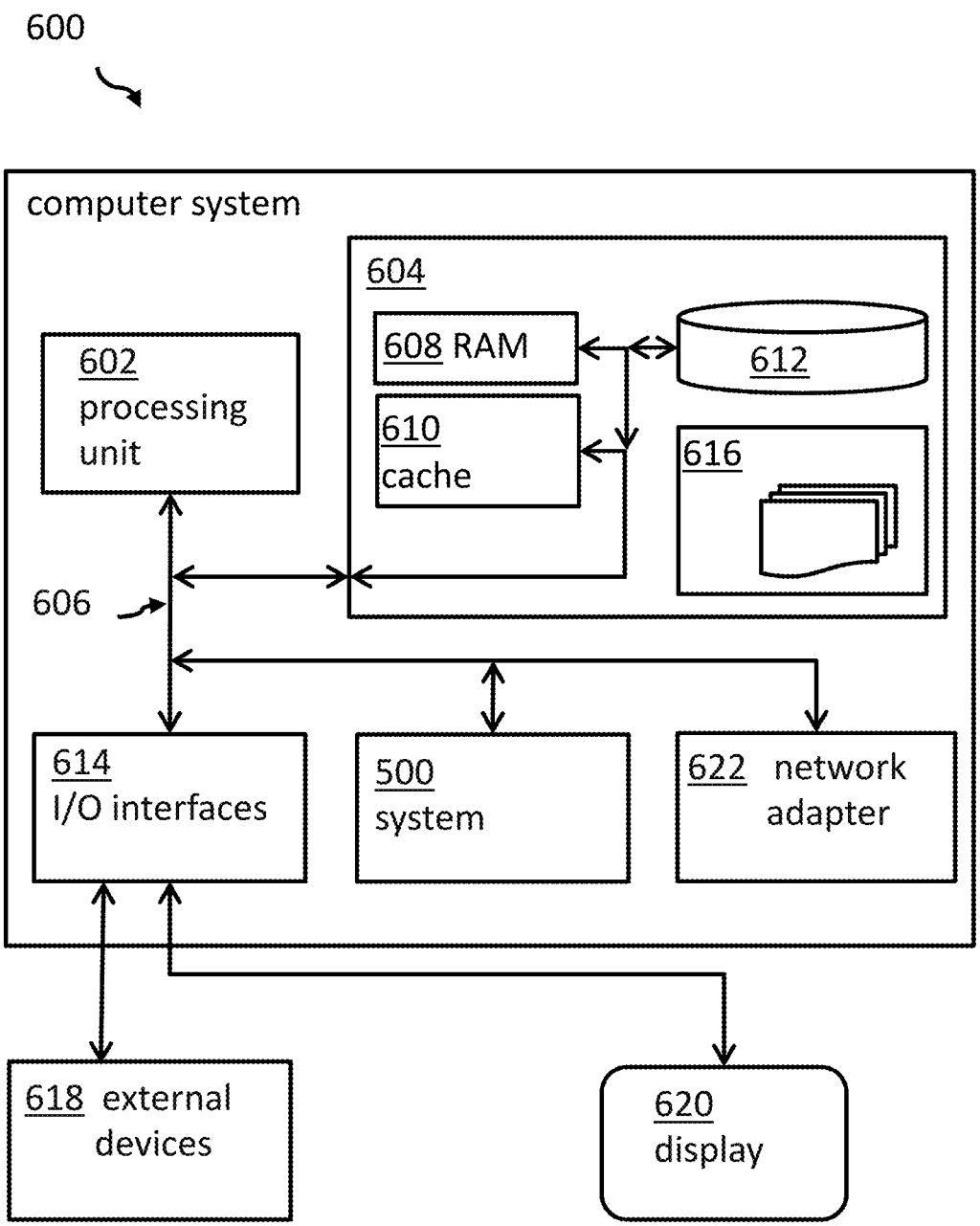

FIG. 6 shows a block diagram of an exemplary computer system instrumental for executing the proposed concept.

DETAILED DESCRIPTION

In the context of this description, the following conventions, terms and/or expressions may be used:

The term 'training data' may denote a set of data to be used for a training of artificial intelligence (AI) systems, machine learning systems and/or neural networks. In supervised learning it is necessary to have annotated data, i.e., training data with an annotation. Adding these metadata manually, may be a lot of effort. The here proposed concept discloses how training data may be generated automatically from publicly available sources for supervised learning of AI systems.

The term 'document component' may denote a portion of a page of a published document—e.g., a PDF document—that may comprise elements that are not only text elements. Such elements may be all elements comprising some sort of graphical element or elements indicative of a citation, headlines or other "non-usually positioned" elements with a high probability of not belonging to the regular text flow. Examples may be tables, mathematical formulas, organigrams, images, charts, and the like. Typically, a bounding box may surround such a non-text-only component. The also available sync file from the compilation process of the TeX source file may give an indication to such non-text-only components. On the other side, the analyzer needs to be enabled to also determine a presence of such components in the graphical appearance of the PDF document.

The term 'TeX' may denote the typesetting or formatting format designed and mostly written by Donald Knuth. It may allow a design of documents completely independent of the underlying computer system. TeX is pretty popular in academia, especially in mathematics, computer science, economics, engineering, and other science areas in which formulas and other graphical expressions are used a lot. Popular implementations include, e.g., LaTeX and ConTeXt.

The term 'TeX source file' may denote a file comprising content in the form of written text as well as references to e.g., formulas and graphics/images together with typesetting/formatting commands in form of TeX commands The term 'portable document format (PDF) file' may denote a file format for a document including, e.g., text and images originally developed by Adobe. Today, it refers to ISO 32000.

The term 'sync file' may denote the specific file generated during a compilation of a TeX source file enabling a synchronization between the TeX source file and a PDF output file. The sync file enables the feature in the typesetting system that allows a click in the source file to highlight the related element in the PDF output file and vice versa.

The term 'a non-text-only document component' may denote an element, e.g., as part of the PDF output, which comprises text and non-text elements. This may be, e.g., the case for a table, an x-y-plot with additional explanations and units on the x-axis or y-axis, a photo/image including text elements (e.g., from a billboard) or an additional explanatory text within the image, a map, an organigram or an element linked to the character-comprising element indicative of a citation. Basically, all document components that do not belong to the normal text flow may be denoted as non-text-only document component. The kind of the non-text-only document component may be denoted as 'type'.

The term 'coordinates' may denote, e.g., an x/y value tuple denoting a reference point of a bounding box (e.g., top left corner) or a document component measured from a reference point of the PDF document page, e.g., the top left corner.

The term 'bounding box' may denote, in geometry, the minimum or smallest bounding or enclosing box for a point set (S) in N dimensions. It may be the box with the smallest measure (area, volume, or hyper-volume in higher dimensions) within which all the points lay. When other kinds of measures are used, the minimum box is usually called accordingly, e.g., "minimum-perimeter bounding box". Transformed to the typesetting environment, the bounding box may refer to an enclosing box—in some cases, a smallest enclosing box—for a given graphical element, e.g., a table, an image or another kind of graphical element. The graphical element may also comprise text/character elements.

The proposed computer-implemented method for collecting training data of document component may offer multiple advantages and technical effects:

By using the sync function and the related sync file which may be generated during a compilation of a TeX source file a link in form of coordinates on a page between the TeX source file and the related PDF document component may elegantly be established. Thus, it becomes possible to link a recognized non-text document component and a PDF document to the type of non-text document component which is defined in the originating typesetting source document. This way, an automated labeling, i.e., an automatic generation of annotated non-text document components may become possible which may be used as training data for machine-learning systems used for artificial intelligence based solutions.

The data included in the sync file generated together with the related PDF file of a TeX typesetting source file may make it possible to establish a link of bounding boxes, including text and their originally defined type of the non-text document component.

In the following, additional embodiment of the method—also applicable to the related system—will be described:

According to one permissive embodiment of the method, the coding in the typesetting language TeX may be performed by the LaTeX typesetting package. It may also be understood that LaTeX may represent only an example of a typesetting system. As long as the typesetting system is programmable in the TeX language and as long as a sync file may be generated, the proposed concept may work without any changes.

According to a further permissive embodiment of the method, the analysis of the PDF file may also comprise determining a path—i.e., a line—in the non-text-only document component. This may be useful for determining to what document cluster the non-text-only document component belongs to. E.g., whether the line may be used as a separating element within the non-text-only document component or whether it may belong to a specific figure, like a machine part or a line in an x-y-chart. The so-determined line information may be used later-on to further determine the internal structure of the document component.

According to one embodiment, the method may also comprise storing a plurality of the combined determined text elements and the linked types of non-text document components in a repository. Thus, a further detailed analysis process may easily refer to the document components in the repository either as text elements and/or as graphical elements.

According to one advantageous embodiment, the method may also comprise training a machine learning model using the stored plurality of determined text elements and the linked types of non-text document components. This may represent one of the positive and remarkable effects of the proposed concept because so far non-annotated graphical elements in PDF documents—in particular in scientific PDF documents—may now have an automatically generated annotation or metadata to use them as input for supervised machine learning processes.

According to one embodiment of the method, the determining a typesetting command may relate to at least one of the group comprising a table, a title (or subtitles), a headline, a formula, a figure, a citation, a list or nested lists. Thus, all typical non-pure text elements in a PDF document may also be addressable and interpretable using machine intelligence without any manual annotation. This may expand the available universe of training data significantly.

According to one useful embodiment of the method, the first coordinates and the second coordinates may be each a tuple of top left corner coordinates and lower left corner coordinates of rectangular boxes relative to a top left corner of the related page. With this, the location of the bounding box on the PDF page may be described exactly and the information/data may also be used for a back-linking to the TeX source file using the sync file.

In the following, a detailed description of the figures will be given. All instructions in the figures are schematic. Firstly, a block diagram of an embodiment of the inventive computer-implemented method for collecting training data of document components is given. Afterwards, further embodiments, as well as embodiments of the system for collecting training data of document components, will be described.

FIG. 1 shows a block diagram of an embodiment of the computer-implemented method 100 for collecting training data of document components—in particular, document processing components like tables, figures etc.—having a structure—in particular an internal structure not being extractable by state-of-the-art mechanisms. The documents are coded in the typesetting language TeX. The method 100 comprises receiving, 102, a TeX source file, i.e., plain text including the required typesetting commands, compiling, 104, the TeX source file into a portable document format (PDF) file and a related sync file, analyzing, 106, the—in particular by a parsing process—the PDF file. Thereby, a presence of a non-text-only document component is determined. The non-text-only document may in particular refer to at least one of the group comprising a table, a figure, an image, etc.

The method 100 comprises further determining, 108, first coordinates—e.g., the top left corner of page being a reference point—of the non-text-only document component and a corresponding page number in the PDF file. The page number may either be derived from metadata from the PDF document (total number of pages of the file, cut marks between the pages, etc.) or may be determined, using OCR techniques (optical character recognition) of specific marks or specific fields on the PDF page.

The method 100 comprises additionally determining, 110, a typesetting command—in particular at least one typesetting command—relating to at least one non-text-only document component in the TeX source file which may as well be described as "component of interest", as well as second coordinates of a corresponding bounding box of the non-text-only document component and the corresponding page number in the PDF file from the sync file.

Furthermore, the method 100 comprises determining, 112, text elements in the non-text-only document component of the PDF file for which the first coordinates and the second coordinates overlap. Hence, with this step a reference can be built between corresponding document components in the TeX source file and the visually represented PDF file.

Last but not least, the method 100 comprises, 114, combining the determined text elements and linking them to a type of a non-text document component determined in the non-text-only document component in the TeX source file. With this step, the link between the graphical representation and the TeX source code is manifested.

FIG. 2 shows an exemplary document page 200 which may have been generated as a PDF output of the compilation process of a TeX source file. The page 200 comprises a headline 202, a table 204, an image (photography) 206, an x-y-chart 208 including text elements, and a plurality of formulas 210. The document page 200 is assumed to be the output of a related TeX file (not shown here).

FIG. 3 shows a block diagram 300 of an embodiment of the document page 200 seen "through the eyes" of an analyzer. In particular, recognized text elements—especially, numbers and characters—are shown as black boxes, also within areas that relate to areas of special interest. These areas of special interest are encircled by dotted line bounding boxes 302, . . . , 312. Typically, recognized text elements within these bounding boxes are often seen as unlinked terms and are ignored during a text interpretation of a PDF page because the terms alone are not embedded in a meaning or context. However, using the proposed concept, these text elements inside the bounding box can be used as metadata or annotation of these non-text-only document components within the boundary boxes. In addition, the text elements within the bounding boxes are also present in the TeX source file.

FIG. 4 shows a TeX code segment 402 relating to the table 204 of FIG. 2 and the corresponding bounding box 302 of FIG. 3. The code segment describes, as an example, the first line of the table in addition to some lines in the table as well as a headline of the table. Thus, the commands relating to the areas of special interest can be isolated as "begin{tabular}" and "\end{tabular}". Through the reference to the top left corner coordinates of the bounding box 302 of FIG. 2 and the appearance of the table in the PDF file (compare FIG. 2), a linkage via the sync file may be made because the definition of the table in the TeX file overlaps with the appearance of the table area-wise. Thus, the text inside the non-text-only component in the bounding box 302 can be defined as annotation to or metadata for the table.

The TeX code segment 404 is another example of a reference to a bounding box, in particular bounding box 304 of FIG. 3 of the image 206 of FIG. 2. Also here, keywords for areas of interest can be determined like "\citep . . . " and "epsscale . . . ", which work as a bracket in which code segments for a specific bounding box are included in the code segment 402.

The code segment 406 is a further example of a reference to another bounding box, in particular bounding box 306 of FIG. 3 referring to the x-y-chart 208 of FIG. 2. The x-y-chart 208 represents different measurement curves but also recognizable characters in numbers which may again be used as metadata/annotation terms for the bounding box/the image.

As a summary it is noteworthy to mention that the bridge between the TeX source code and the analyzed, determined and recognized layout in their corresponding PDF document is the sync file as well as reference coordinates of the bounding box (e.g., left top corner and bottom right corner). Whenever the analysis of the proposed method determines a geometrical overlay or overlap between a non-character area of the visual appearance of the PDF document and the related code segment of the TeX file is determined, the system has detected a non-text-only document component which may be automatically annotated to be used as training data—sometimes also denoted as ground truth—for artificial intelligence systems.

FIG. 5 shows a block diagram of the collection system 500 for collecting training data of document components having a structure. The documents source is coded in the typesetting language TeX and the system comprises a receiving unit 502 adapted for receiving a TeX source file, a compiler module 504 adapted for compiling the TeX source file into a portable document format (PDF) file and a related sync file, and an analyzer module 506 adapted for analyzing the PDF file, thereby determining a presence of a non-text-only document component.

The system 500 comprises also a determination unit 508 adapted for determining first coordinates of the non-text-only document component and a corresponding page number in the PDF file. Thereby, the determination unit 508 is also adapted for determining a typesetting command relating to a non-text-only document component in the TeX source file, as well as second coordinates of a corresponding bounding box of the non-text-only document component and the corresponding page number in the PDF file from the sync file. Furthermore, the determination unit 508 is also adapted for determining text elements in the non-text-only document component of the PDF file for which the first coordinates and the second coordinates overlap.

A combination module 510 is adapted for combining the determined text elements and linking them to a type of a non-text document component determined in the non-text-only document component in the TeX source file. As discussed above, the sync file generated by the TeX compiler module builds the bridge between the TeX source code and the visual appearance in the generated PDF document.

It may also be noted that the non-text-only document component described by the TeX source file and the determined and recognized non-text-only document component in the PDF file visual appearance shall be related to the same page of the respective document.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the system 500 for collecting training data of document components may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for collecting training data of document components having a structure, said documents being coded in said typesetting language TeX, said method comprising:
    receiving a TeX source file;
    compiling said TeX source file into a portable document format (PDF) file and a related sync file;
    analyzing said PDF file, thereby determining a presence of a non-text-only document component;
    determining first coordinates of said non-text-only document component and a corresponding page number in said PDF file;
    determining a typesetting command relating to a non-text-only document component in said TeX source file, as well as second coordinates of a corresponding bounding box of said non-text-only document component and said corresponding page number in said PDF file from said sync file;
    determining text elements in said non-text-only document component of said PDF file for which said first coordinates from said PDF file and said second coordinates from said sync file overlap; and
    combining said determined text elements and linking them to a type of a non-text document component determined in said non-text-only document component in said TeX source file,
    wherein responsive to determining a geometrical overlay between a non-character area of a visual appearance of the PDF file and a related code segment of the TeX source as determined from said sync file, said non-text-only document component is annotated automatically with said determined text elements.

2. The method according to claim 1, wherein said coding in said typesetting language TeX is performed by said LaTeX typesetting package.

3. The method according to claim 1, wherein said analyzing said PDF file also comprises
    determining a path in said non-text-only document component.

4. The method according to claim 1, also comprising storing a plurality of said combined determined text elements and said linked types of non-text document components in a repository.

5. The method according to claim 4, also comprising training a machine learning model using said stored plurality of determined text elements and said linked types of non-text document components.

6. The method according to claim 1, wherein said determining a typesetting command relates to at least one of a table, a title, subtitles, a headline, a formula, a figure, a citation, a list and nested lists.

7. The method according to claim 1, wherein said first coordinates and said second coordinates are each a tuple of top left corner coordinates and lower left corner coordinates of rectangular boxes relative to a top left corner of said related page.

8. A collection system for collecting training data of document components having a structure, said documents being coded in said typesetting language TeX, said system comprising:
   A processor; and
   a memory device coupled with the processor;
   the processor configured to:
   receive a TeX source file;
   compile said TeX source file into a portable document format (PDF) file and a related sync file;
   analyze said PDF file, thereby determining a presence of a non-text-only document component;
   determine first coordinates of said non-text-only document component and a corresponding page number in said PDF file;
   determine a typesetting command relating to a non-text-only document component in said TeX source file, as well as second coordinates of a corresponding bounding box of said non-text-only document component and said corresponding page number in said PDF file from said sync file;
   determine text elements in said non-text-only document component of said PDF file for which said first coordinates from said PDF file and said second coordinates from said sync file overlap; and
   combine said determined text elements and linking them to a type of a non-text document component determined in said non-text-only document component in said TeX source file,
   wherein responsive to determining a geometrical overlay between a non-character area of a visual appearance of the PDF file and a related code segment of the TeX source as determined from said sync file, said non-text-only document component is annotated automatically with said determined text elements.

9. The system according to claim 8, wherein said coding in said typesetting language TeX is performed by said LaTeX typesetting package.

10. The system according to claim 8, wherein said processor is further configured to determine a path in said non-text-only document component.

11. The system according to claim 8, wherein the memory device is configured to store a plurality of said combined determined text elements and said linked types of non-text document components in a repository.

12. The system according to claim 8, wherein the processors is further configured to train a machine learning model using said stored plurality of determined text elements and said linked types of non-text document components.

13. The system according to claim 8, wherein the typesetting command relates to at least one of a table, a title subtitles, a headline, a formula, a figure, a citation, a list and nested lists.

14. The system according to claim 8, wherein said first coordinates and said second coordinates are each a tuple of top left corner coordinates and lower left corner coordinates of rectangular boxes relative to a top left corner of said related page.

15. A computer program product for collecting training data of document components having a structure, said documents being coded in said typesetting language TeX, said computer program product comprising a computer readable storage medium having program instructions embodied therewith, said program instructions being executable by one or more computing systems or controllers to cause said one or more computing systems to:
   receive a TeX source file;
   compile said TeX source file into a portable document format (PDF) file and a related sync file;
   analyze said PDF file, thereby determining a presence of a non-text-only document component;
   determine first coordinates of said non-text-only document component and a corresponding page number in said PDF file;
   determine a typesetting command relating to a non-text-only document component in said TeX source file as well as second coordinates of a corresponding bounding box of said non-text-only document component and said corresponding page number in said PDF file from said sync file;
   determine text elements in said non-text-only document component of said PDF file for which said first coordinates from said PDF file and said second coordinates overlap from said sync file; and
   combine said determined text elements and linking them to a type of a non-text document component determined in said non-text-only document component in said TeX source file,
   wherein responsive to determining a geometrical overlay between a non-character area of a visual appearance of the PDF file and a related code segment of the TeX source as determined from said sync file, said non-text-only document component is annotated automatically with said determined text elements.

* * * * *